J. R. Thorne
Imp'd. Chain Hook

116511

PATENTED JUN 27 1871

Witness
Henry C. Houston
Wm Franklin Leavey

Inventor
J. R. Thorne
Per Wm H. Clifford atty.

UNITED STATES PATENT OFFICE.

JOHN R. THORNE, OF WALDOBOROUGH, MAINE.

IMPROVEMENT IN CHAIN-HOOKS.

Specification forming part of Letters Patent No. 116,511, dated June 27, 1871; antedated June 16, 1871.

*To all whom it may concern:*

Be it known that I, JOHN R. THORNE, of Waldoborough, in the county of Lincoln and State of Maine, have invented a new and useful Improved Chain-Hook; and I do hereby declare the following to be a full, clear, and exact description of the same, which will enable others to make and use my invention, reference being had to the accompanying drawing forming part of this specification, in which—

Figure 1:
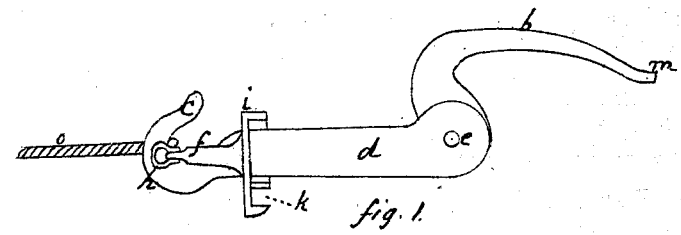
Figure 2:
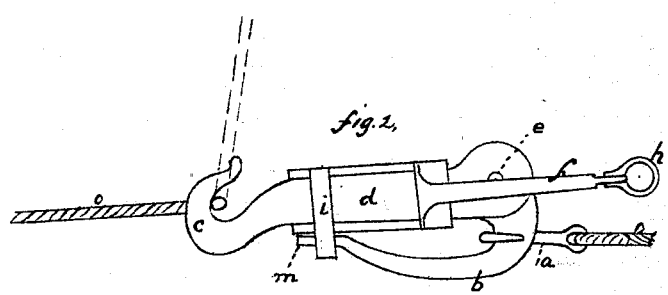

Figure 1 is a side elevation, showing the position of the hook when detached or unhooked. Fig. 2 is a view of the same when fastened or in position to sustain a load.

My invention relates to a device for discharging loads of earth, rock, &c., when excavations are being made, and is for thus discharging such loads when the same are elevated in the air by a derrick or such devices as are in common use for this purpose.

The hook is connected with a chain that is simply passed down around the bottom of the scoop or other receptacle in which the earth is placed, and a hook, $a$, is passed into the catch $b$, the other end of the chain or rope passing through the hook $c$ on the main stock of the detaching-hook. The arm or catch $b$ is pivoted to the head of the stock $d$ at $e$, so as to be capable of turning or swinging up, as seen in Fig. 2, in order to release the hook $a$ and its rope or chain. $f$ is an arm or lever with a ring, $h$. This arm or lever $f$ is bifurcated so as to pass over each side of $d$, and is, at the lower end, connected to a clutch or catch, $i$, which has a slot, $k$. This slot is to pass over the lower end $m$ of the catch $b$ when it is in the position seen in Fig. 2, and so hold it in place, and thus form the loop into which the hook $a$ is passed. The clutch $i$ is pivoted to the stock $d$ so as to turn from the position seen in Fig. 2 to that illustrated in Fig. 1, in which latter figure the position of the arm $f$ is seen when the piece $b$ is released.

The operation is as follows: The chain or cord $o$ is attached to the hook, as described and illustrated, the rope going under the platform, scoop, or receptacle in which the earth or rock is placed. The position of the detaching-hook is nearly horizontal over the receptacle for the earth. The receptacle is then raised and swung around to the desired point. A cord is attached to the ring $h$, and, passing over a pulley at some convenient point, extends down so as to be reached by the hand of the workman. When this cord is pulled the arm $f$ is pulled out, as illustrated in Fig. 1, thus releasing $b$ and, consequently, the hook $a$. Thus, the support for the receptacle being taken away on one side, it tips and discharges its load, and then the device is swung back to receive another load. As before mentioned, a derrick can be used to turn the receptacle backward and forward.

I do not claim a harness-hook for liberating horses from carriages, as set forth in J. L. Dickinson's patent No. 73,958, February 4, 1868. The method and devices for casting off the chain are different in mine from those used in the above-named patent for releasing the animal. Neither do I claim the combination of a hinged arm, a swinging catch, a clevis, and a shank, constructed as set forth in Tuttle and Peterson's patent No. 102,067, April 19, 1870. James A. Davis' patent for detaching boats, No. 29,064, July 10, 1860, is also different from mine in construction and operation, and I hereby disclaim the combination of the hinge-catch and ring, and the suspension and trip-ropes, and pulleys and trip-hooks, as therein set forth.

My invention is designed to be employed on large scoops or excavators of dirt and soil. These, when loaded at one place, are then commonly raised and swung around by a derrick or some such means to a point where a filling is to be made or the soil deposited, where the same is effected by letting one side of the scoop so drop down that the dirt will slip off, while the other side is still connected to the hook or the supporting-rope. Now, the rope $o$ passing under or around the scoop, keeps it horizontal until it is desired to discharge the load; then, by pulling down on a cord attached at $h$, the hook $b$ $m$ is, of course, left unsupported, and is pulled out or down, as seen in Fig. 1, the rope connected with the hook $a$ released, and, the scoop tipping down, allows the dirt to slip off, and then the scoop is brought back to the position where it is loaded again, thus hanging down.

What I claim as my invention, and desire to secure by Letters Patent, is—

The within-described chain-hook, consisting of the stock $d$ with the open hook $c$, the hinged hook $b$, and bifurcated lever $f$ carrying the catch $i$ $k$, all constructed, arranged, and operating as herein set forth.

JOHN R. THORNE.

Witnesses:
WM. HENRY CLIFFORD,
HENRY C. HOUSTON.